(12) United States Patent
He et al.

(10) Patent No.: US 11,188,846 B1
(45) Date of Patent: Nov. 30, 2021

(54) DETERMINING A SEQUENTIAL ORDER OF TYPES OF EVENTS BASED ON USER ACTIONS ASSOCIATED WITH A THIRD PARTY SYSTEM

(71) Applicant: Facebook, Inc., Menlo Park, CA (US)

(72) Inventors: Lian He, Belmont, CA (US); Minghao Wang, Shoreline, WA (US); Tobias Henry Wooldridge, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 469 days.

(21) Appl. No.: 16/190,121

(22) Filed: Nov. 13, 2018

(51) Int. Cl.
  *G06N 20/00* (2019.01)
  *G06N 7/00* (2006.01)
  *G06F 16/901* (2019.01)
  *G06N 5/00* (2006.01)

(52) U.S. Cl.
  CPC ......... *G06N 20/00* (2019.01); *G06F 16/9024* (2019.01); *G06N 5/00* (2013.01); *G06N 7/005* (2013.01)

(58) Field of Classification Search
  None
  See application file for complete search history.

(56) References Cited

U.S. PATENT DOCUMENTS

| | | | | |
|---|---|---|---|---|
| 8,510,309 B2* | 8/2013 | Priyadarshan | ......... | G06Q 30/02 707/740 |
| 2011/0295626 A1* | 12/2011 | Chen | .................... | G06Q 10/063 705/7.11 |
| 2015/0066593 A1* | 3/2015 | Huang | ............... | G06Q 30/0202 705/7.31 |
| 2015/0100415 A1* | 4/2015 | Yu | ...................... | G06Q 30/0251 705/14.49 |
| 2018/0150572 A1* | 5/2018 | Yates | ..................... | G06Q 50/01 |

FOREIGN PATENT DOCUMENTS

WO   WO 2013/043346 A1 *  3/2013  ........... G06Q 10/101

OTHER PUBLICATIONS

Gotz, David, and Harry Stavropoulos. "Decisionflow: Visual analytics for high-dimensional temporal event sequence data." IEEE transactions on visualization and computer graphics 20.12 (2014): 1783-1792. (Year: 2014).*

* cited by examiner

*Primary Examiner* — Kakali Chaki
*Assistant Examiner* — Chaitanya R Jayakumar
(74) *Attorney, Agent, or Firm* — Fenwick & West LLP

(57) ABSTRACT

An online system receives information describing events corresponding to actions associated with a third party system performed by an individual. The received information describes event types and times at which the events occurred. The online system generates nodes of a directed graph associated with the third party system, in which each node corresponds to an event type. For each event, a node count associated with a node corresponding to the event's type is incremented by the online system. Pairs of consecutively occurring events are identified based on times at which the events occurred and an edge describing each transition from one event to another is generated by the online system. The online system determines an edge count for each transition indicating a number of edges describing the transition as well as a sequential order of event types based on one or more node counts and one or more edge counts.

18 Claims, 6 Drawing Sheets

DETERMINING A SEQUENTIAL ORDER OF TYPES OF EVENTS BASED ON USER ACTIONS ASSOCIATED WITH A THIRD PARTY SYSTEM

BACKGROUND

Content items may be included in content campaigns based on common objectives associated with the content items, such as purchasing products or services, registering for memberships, viewing web pages or other content, etc. Furthermore, various objectives associated with content campaigns may be achieved if individuals presented with content items included in the campaigns perform actions that correspond to various types of events that are ordered in a sequential manner.

A sequentially ordered set of types of events that are associated with a content campaign may be visually represented as a funnel, in which individuals may progress along different stages within the funnel that correspond to the types of events and more individuals are likely to perform actions corresponding to the early stages than in the later stages. In the above example, a first stage of the funnel may be completed by 100 individuals, a second stage of the funnel may be completed by 40 individuals, a third stage of the funnel may be completed by 15 individuals, and a fourth and final stage of the funnel may be completed by 10 individuals. In this example, only 10% of the original 100 users presented with the content item will have proceeded through all of the stages, in which the percentage of users completing the stages decreases while progressing through the funnel.

Online systems at which content campaigns are maintained may leverage information describing stages of funnels associated with the content campaigns when selecting content items for presentation to online system users (e.g., to retarget content items to users who have come close to, but have not yet completed all the stages of a funnel). If the content campaign is maintained in an online system, upon identifying an opportunity to present content to a viewing user of the online system, the online system may determine whether the user has completed any stages of the funnel (e.g., based on information maintained in the online system describing actions previously performed by the user). The online system may then predict a likelihood that the viewing user will complete any remaining stages of the funnel (e.g., based on user-specific information associated with the viewing user or other online system users having at least a threshold measure of similarity to the viewing user, such as user profile information, information describing similar actions previously performed by the user(s), etc.). The online system may determine whether to present a content item included in the content campaign to the user based on the predicted likelihood (e.g., in a content selection process).

SUMMARY

This disclosure relates generally to determining types of events associated with a third party system, and more specifically to determining a sequential order of types of events based on user actions associated with a third party system.

To accurately and comprehensively describe the stages of funnels associated with content campaigns, an online system generates a directed graph of events that describes the sequential order in which types of events occur. This order may reflect stages of funnels associated with the content campaigns. Rather than a funnel pre-defined by a sponsor, the directed graph may thus be used to infer the interaction pathways of users (e.g., the "shape" of the funnel) towards desired interactions based on the order of events actually engaged in by users. The online system generates the directed graph based on information received at the online system describing events corresponding to actions associated with a third party system performed by one or more individuals. The information received at the online system may describe the types of events, the times at which the events occurred, the third party system, and/or each individual who performed an action corresponding to each event.

The online system generates nodes of a directed graph associated with the third party system, in which each node corresponds to a particular event (e.g., a particular type or identifier of an event). For each event of a particular type for which the online system received information, the online system increments a node count associated with a node corresponding to the type of event. Based on the times at which the events occurred for a given user (or similar identifier), the online system identifies pairs of consecutively occurring events and generates edges of the directed graph, in which each edge describes a transition from a first event of a pair of consecutively occurring events to a second event of the pair of consecutively occurring events. For each transition described by one or more edges, the online system determines an edge count indicating a number of edges describing the transition. In various embodiments, the node counts (and hence the edge counts) may be incremented based on events that occur within a timeframe (e.g., one day, seven days, 14 days, etc.), which may be specified by a user or other entity associated with the third party system.

The online system then determines a sequential order of types of events based on one or more node counts and one or more edge counts. The online system may identify the sequential order of types of events by identifying a first node of the directed graph corresponding to an entry point event and a last node of the directed graph corresponding to an exit point event. The first node and the last node may be identified based on one or more node counts associated with the nodes and one or more edge counts associated with transitions to or from the nodes. The online system also may identify types of events that may occur between the entry point event and the exit point event based on a directionality and/or a bidirectionality of transitions to, from, and between the types of events.

The online system may then train a set of machine-learning models to predict likelihoods that users of the online system will perform a sequence of actions associated with the third party system corresponding to the sequential order of types of events related to the determined order from entry point event to exit point event. Each model in the set of machine-learning models may correspond to each type of event in the sequence and the models may be ordered according to the sequence. Different weights may be assigned to different models based on various factors (e.g., based on node counts associated with nodes corresponding to the types of events, the sequential order of the types of events, the amount of training data available to train each model, etc.).

The online system may receive a content item associated with an objective corresponding to a type of event included in the sequential order of types of events. Upon identifying an opportunity to present content to a viewing user, the online system may use the set of models to predict a likelihood that the viewing user will perform a sequence of actions corresponding to the sequential order of types of events in response to being presented with the content item. The online system may then determine whether to present the content item to the viewing user based on the predicted likelihood (e.g., in a content selection process).

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
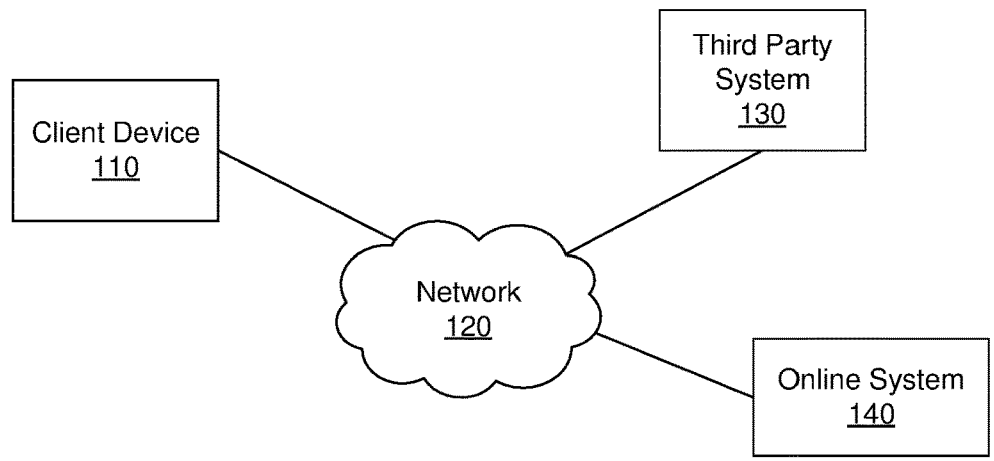
FIG. 1 is a block diagram of a system environment in which an online system operates, in accordance with an embodiment.

FIG. 1 is a block diagram of a system environment 100 for an online system 140.

The system environment 100 shown by FIG. 1 comprises one or more client devices 110, a network 120, one or more third party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 may also communicate information to the online system 140, such as advertisements, content, or information about an application provided by the third party system 130.

Figure 2:
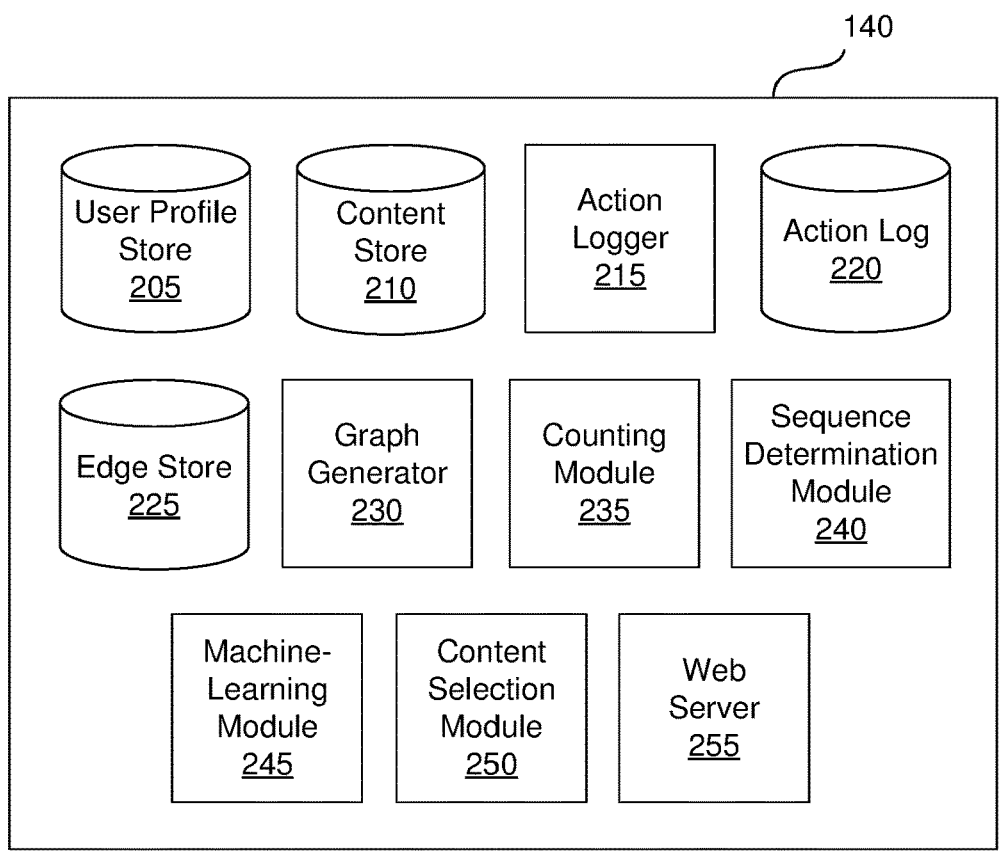
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a graph generator 230, a counting module 235, a sequence determination module 240, a machine-learning module 245, a content selection module 250, and a web server 255. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

In some embodiments, the user profile store 205 may store user identifying information for users of the online system 140 or other individuals. User identifying information for a user/individual may include personally identifiable information. Examples of personally identifiable information include a full name, a home address, a phone number, an email address, a user identifier that is unique to a user in the online system 140 or to a user/individual in a third party system 130 (e.g., a username, a user identification number, or a cookie identifier), a client device identifier (e.g., an IP address), a browser identifier (e.g., a user agent), etc. In some embodiments, user identifying information also may include additional types of information that potentially may be combined with other personal information to identify an online system user or other individual, such as an age, a gender, a geographic region, etc. For example, user identifying information for an online system user may include a combination of the user's first name, age, hometown, educational background, and occupation.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects stored in the content store 210 are received from third party applications or third party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items represented by objects stored in the content store 210 include various types of content to be presented to users of the online system 140 and may be associated with bid amounts. Examples of such types of content include text, image, audio, video, or any other suitable types of data that may be presented to a user of the online system 140. In various embodiments, the content also may specify a page of content. For example, a content item includes a link to a landing page, in which the link specifies a network address of a page of content to which a user is directed when the content item is accessed. A bid amount associated with a content item may be specified by a user of the online system 140 who provided the content item to the online system 140 (a "content provider") and is used to determine an expected value, such as monetary compensation, provided by the content provider to the online system 140 if content in the content item is presented to a user of the online system 140, if the content in the content item receives a user interaction when presented, or if any suitable condition is satisfied when content in the content item is presented to a user of the online system 140. For example, a bid amount associated with a content item specifies a monetary amount that the online system 140 receives from a content provider if content in the content item is displayed. In some embodiments, an expected value to the online system 140 of presenting content included in a content item may be determined by multiplying a bid amount associated with the content item by a probability that the content included in the content item is accessed by a user of the online system 140.

In various embodiments, a content item includes various components capable of being identified and retrieved by the online system 140. Example components of a content item include: a title, text data, image data, audio data, video data, a landing page, a user associated with the content item, or any other suitable types of information. The online system 140 may retrieve one or more specific components of a content item for presentation in some embodiments. For example, the online system 140 may identify a title and an image of a content item and provide the title and the image for presentation to a user of the online system 140 rather than the content item in its entirety.

Various content items may be associated with objectives identifying actions that content providers associated with the content items desire other users to perform when presented with content included in the content item. Example objectives include: installing an application associated with a content item, indicating a preference for a content item, sharing a content item with other users, interacting with an object associated with a content item, or performing any other suitable types of actions associated with a content item. As content from a content item is presented to online system users, the online system 140 logs interactions between users presented with the content item or with objects associated with the content item. Additionally, the online system 140 receives compensation from a content provider associated with a content item as online system users perform interactions with the content item or objects associated with the content item that satisfy an objective associated with the content item.

Additionally, a content item may be associated with one or more targeting criteria specified by a content provider. Targeting criteria associated with a content item specify one or more characteristics of users eligible to be presented with the content item. For example, targeting criteria are used to identify users having user profile information, edges, or actions satisfying at least one of the targeting criteria. Hence, targeting criteria allow a content provider to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria may identify users who have taken a particular action, such as sending a message to another user, using an application, joining a group, leaving a group, joining an event, generating an event description, purchasing or reviewing a product or service, using an online marketplace, requesting information from a third party system 130, installing an application, or performing any other suitable action. Including actions in targeting criteria allows content providers to further refine users eligible to be presented with content items. As another example, targeting criteria may identify users having a connection to another user or object or having a particular type of connection to another user or object.

In various embodiments, the content store 210 includes objects representing content campaigns, in which each content campaign includes one or more content items. A content campaign may be associated with one or more characteristics that are attributed to each content item of the content campaign. For example, a bid amount associated with a content campaign is associated with each content item of the content campaign. Similarly, an objective associated with a content campaign is associated with each content item of the content campaign. In various embodiments, a content provider provides various content campaigns to the online system 140, in which each content campaign includes content items having different characteristics (e.g., content items associated with different content, content items including different types of content for presentation to online system users). In such embodiments, objects representing the campaigns are stored in the content store 210.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

In one embodiment, the action logger 215 uses a tracking pixel or a piece of HTML code placed on third party websites that have not opted out of tracking to monitor visits to the websites by online system users or other individuals. A tracking pixel might be included on various pages, including a product page describing a product, a shopping cart page that a user or other individual visits upon adding something to a shopping cart, a checkout page that a user or other individual visits to checkout and purchase a product, etc. For example, a tracking pixel results in a transparent 1×1 image, an iframe, or other suitable object being created for third party pages. When a browser loads a page having the tracking pixel, the browser attempts to retrieve the content for that pixel and contacts the online system 140 to retrieve the content. The request sent to the online system 140 includes various data about the actions performed by an online system user or other individual on the third party website. The third party website may control what data is sent to the online system 140. For example, the third party website may include information about a page an online system user or other individual is loading (e.g., information identifying the page as a product page, a shopping cart page, a checkout page, etc.), information on the page or about a product on the page that may be of interest to the user/individual (e.g., the SKU number, the color, the size, the style, and/or the current price of the product, any discounts offered on the product, the quantity of the product being requested, etc.), information about the user/individual (e.g., the third party's user identifier (UID) for the user/individual, contact information for the user/individual, etc.), and any other suitable types of data.

In some embodiments, a cookie set by the online system 140 also may be retrieved by the online system 140, which may include various types of data about an online system user or other individual, such as the online systems' UID for the user/individual, information about the client device 110 and the browser being used by the user/individual, such as the Internet Protocol (IP) address of the client device 110, among other data. Tracking can also be performed on mobile applications of content providers by using a software development kit (SDK) of the online system 140 or via an application programming interface (API) of the online system 140 that tracks events (e.g., purchases) associated with online system users occurring on the content provider's application and reports them to the online system 140.

The online system 140 may use data received about an online system user to serve better content to the user in the future (e.g., since the online system 140 has additional data about products purchased or browsed by the user that might be of interest to the user). The online system 140 also may use this data to retarget content to the user (e.g., if the user accessed a product page on a third party website by clicking on a content item associated with the third party website that was presented to the user in the online system 140). Additionally, the online system 140 may use this data to track conversions and to report results of advertising campaigns to a third party system 130. For example, if a third party system 130 has requested that the online system 140 present content items included in a content campaign associated with the third party system 130 to users of the online system 140, and a particular user views the content item on the online system 140 and then performs an action in association with being presented with the content item (possibly at some point later and/or on a different client device 110), the online system 140 may link the action to the content item originally presented by the online system 140. Thus, the online system 140 may include this data in a report to the third party system 130 describing a number of conversions the content campaign achieved.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

Various types of information may be stored in the action log 220 describing actions associated with a third party system 130 performed by online system users or other individuals. The information may include a name or other identifier used to identify each type of action performed as well as user identifying information associated with the users/individuals who performed the actions (e.g., usernames associated with users in the online system 140 or with individuals in the third party system 130). The information also may include a unique identification number or other identifier associated with the third party system 130 and may indicate a time at which the actions were performed (e.g., timestamps).

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The graph generator 230 generates one or more directed graphs associated with one or more third party systems 130. It may be difficult to describe the stages of funnels associated with different content campaigns in an accurate and comprehensive manner. This is because every content campaign is unique and therefore may be associated with a unique set of types of events, making it difficult and time-consuming to accurately determine the stages of funnels associated with different content campaigns. Furthermore, since multiple combinations of different types of events may occur in different orders to achieve objectives associated with different content campaigns and content campaigns may be associated with multiple objectives, in practice representing these events as a single funnel may fail to adequately represent actual user behavior with respect to these conversions. To describe the sequential order in which types of events occur accurately, the graph generator 230 generates a directed graph for a third party system 130 used to determine a sequential order of types of events, as described below with reference to the sequence determination module 240.

A directed graph includes multiple nodes corresponding to events and edges connecting the nodes that indicate a directionality of the events (i.e., an order in which the events may occur). To generate a directed graph associated with a third party system 130, the graph generator 230 generates (e.g., as shown in step 310 of FIG. 3) one or more nodes of the graph, in which each node corresponds to a type of event associated with the third party system 130. Each type of event, in turn, corresponds to an action associated with the third party system 130 that may be performed by one or more users of the online system 140 or other individuals. Examples of such actions and/or events include accessing a web page associated with a third party system 130, using an application associated with the third party system 130, clicking on a link to a web page associated with the third party system 130, sharing or expressing a preference for a content item associated with the third party system 130, claiming an offer from the third party system 130, rating an application associated with the third party system 130, viewing a video associated with the third party system 130, or any other suitable types of actions or events that may be associated with the third party system 130. In some embodiments, the graph generator 230 may access the action log 220 to retrieve information describing actions corresponding to events associated with a third party system 130 performed by users of the online system 140 or other individuals. In such embodiments, for each type of event associated with the third party system 130 retrieved by the graph generator 230, the graph generator 230 generates a node of a directed graph associated with the third party system 130.

To generate edges of a directed graph associated with a third party system 130, the graph generator 230 identifies (e.g., as shown in step 320 of FIG. 3) pairs of consecutively occurring events associated with the third party system 130. The graph generator 230 may do so based on the times at which events associated with the third party system 130 occur and user identifying information associated with online system users or other individuals who performed actions corresponding to the events. For example, the graph generator 230 may access the action log 220 and retrieve information describing actions associated with a third party system 130 performed by a user of the online system 140 based on a common set of user identifying information associated with the user (e.g., an IP address, a username, etc.) and information identifying the third party system 130 associated with the actions. In this example, the graph generator 230 may then identify a pair of events as a pair of consecutively occurring events if timestamps associated with actions corresponding to the pair of events indicate that the user did not perform any intervening actions corresponding to other events between the pair of events.

Once the graph generator 230 has identified pairs of consecutively occurring events associated with a third party system 130, the graph generator 230 generates (e.g., as shown in step 325 of FIG. 3) edges of a directed graph based on the pairs of consecutively occurring events that are identified. Each edge generated by the graph generator 230 describes a transition from a first event of a pair of consecutively occurring events to a second event of the pair of consecutively occurring events. For example, if a first event of a pair of consecutively occurring events corresponds to a first node and a second event of the pair of consecutively occurring events corresponds to a second node, and the first event occurred before the second event, the graph generator 230 generates an edge describing a transition from the first event to the second event (e.g., as an arrow from the first node to the second node).

Edges of a directed graph may indicate various relationships between types of events. As described above, in some embodiments, an edge may indicate directionality, such that the edge indicates that one type of event occurs before another type of event. Edges of a directed graph may indicate a co-occurrence of different types of events, such that one type of event occurs when another type of event occurs. For example, if a first set of edges of a directed graph indicates that a first type of event occurs after a second type of event and another set of edges indicates that a third type of event occurs after the second type of event, the edges indicate that the first, second, and third types of events may co-occur. Edges of a directed graph also may indicate bidirectionality, such that a first type of event may occur either before or after a second type of event. For example, if a set of edges between two nodes corresponding to a first type of event and a second type of event indicate that the first type of event occurs before the second type of event and a second set of edges between the two nodes indicate that the second type of event occurs before the first type of event, the two sets of edges indicate bidirectionality, such that the types of events may occur in either order. The functionality of the graph generator 230 is further described below in conjunction with FIGS. 3 and 5.

For each event corresponding to an action associated with a third party system 130 performed by a user of the online system 140 or other individual, the counting module 235 increments (e.g., as shown in step 315 of FIG. 3) a node count associated with a node of a directed graph associated with the third party system 130, in which the node corresponds to a type of event associated with the event. For example, for each event of a particular type associated with a third party system 130 that corresponds to a node in a directed graph associated with the third party system 130, the counting module 235 increments a node count associated with the node. The counting module 235 may access the action log 220 to retrieve information describing actions corresponding to events associated with a third party system 130 performed by online system users or other individuals and increment a node count associated with a node corresponding to each type of event based on the retrieved information. In some embodiments, the counting module 235 may increment node counts associated with nodes of a directed graph based on a specified timeframe. For example, a node count associated with a node may be incremented only if an event of a type corresponding to the node occurs within a timeframe of one day, seven days, 14 days, etc. In embodiments in which the counting module 235 increments node counts associated with nodes of a directed graph based on a timeframe, the timeframe may be specified by an online system user associated with the third party system 130 or any other entity associated with the third party system 130.

For each transition described by one or more edges of a directed graph, the counting module 235 determines (e.g., as shown in step 330 of FIG. 3) an edge count associated with the transition indicating a number of edges describing the transition. For example, if five edges of a directed graph describe a transition from a first event to a second event, the counting module 235 determines an edge count of five associated with the transition. In this example, if seven edges of the directed graph describe a transition from the second event to the first event, the counting module 235 determines an edge count of seven associated with the transition. As described above, in some embodiments, the counting module 235 increments node counts associated with nodes of a directed graph based on a specified timeframe. In such embodiments, the edge count also may be determined based on the same timeframe. The functionality of the counting module 235 is further described below in conjunction with FIG. 3.

The sequence determination module 240 determines (e.g., as shown in step 335 of FIG. 3) a sequential order of types of events associated with a third party system 130. The sequence determination module 240 may do so based on one or more node counts associated with one or more nodes and one or more edge counts associated with one or more transitions described by a directed graph associated with the third party system 130. To determine a sequence of types of events associated with a third party system 130, the sequence determination module 240 may identify a first node and a last node of a directed graph associated with the third party system 130, in which the first node corresponds to an entry point event and the last node corresponds to an exit point event. The first node and the last node may be identified based on node counts associated with the nodes and one or more edge counts associated with transitions to or from the nodes. For example, a first node corresponding to an entry point event may be associated with a node count that is at least a threshold value and a sum of edge counts describing transitions to the entry point event may be less than a threshold value (i.e., few, if any events occur before the entry point event). Similarly, in the above example, a last node corresponding to an exit point event may be associated with a node count that is less than a threshold value and a sum of edge counts describing transitions from the exit point event may be less than a threshold value (i.e., few, if any events occur after the exit point event).

The sequence determination module 240 may identify types of events that may occur between an entry point event and an exit point event based on a directionality and/or a bidirectionality of transitions to, from, and between the types of events. For example, suppose that a first node corresponding to an entry point event (Event 1) is directly connected to a second node corresponding to another type of event (Event 2), which in turn is directly connected to a third node that corresponds to an exit point event (Event 3), such that the third node is indirectly connected to the first node. In this example, suppose also that edges connecting the first node to the second node and the second node to the third node indicate a directionality of each transition between the types of events, such that Event 3 typically occurs after Event 2 and Event 2 typically occurs after Event 1. In the above example, the sequence determination module 240 may determine that a sequence of types of events includes types of events corresponding to the first, second, and third nodes and that the types of events occur in an order based on the directionality of the transitions described by the edges (i.e., Event 1→Event 2→Event 3). Alternatively, in the above example, if edges connecting the first node to the second node indicate a bidirectionality of transitions between Event 1 and Event 2, the sequence determination module 240 may determine that the sequence of events includes types of events corresponding to the first, second, and third nodes and that the types of events occur in an order based on the directionality and the bidirectionality of the transitions described by the edges (i.e., Event 1↔Event 2→Event 3).

A sequential order of types of events associated with a third party system 130 determined by the sequence determination module 240 may be visually represented as a funnel, in which the types of events correspond to stages of the funnel that are organized based on the sequential order. Furthermore, online system users or other individuals may progress along different stages within the funnel by performing actions corresponding to the stages and more users/individuals are likely to perform actions corresponding to the early stages of the funnel than in the later stages. In the above example, a first step of a funnel may correspond to Event 1, a second step of the funnel may correspond to Event 2, and a third step of the funnel may correspond to Event 3, in which more users/individuals are likely to perform an action corresponding to Event 1 than they are to perform actions corresponding to Event 2 and Event 3 and more users/individuals are likely to perform an action corresponding to Event 2 than they are to perform an action corresponding to Event 3.

In various embodiments, a user of the online system 140 or other entity associated with a third party system 130 may modify a sequential order of types of events associated with the third party system 130. For example, suppose that a sequential order of types of events associated with a third party system 130 corresponds to clicking on a content item associated with the third party system 130, accessing a website associated with the third party system 130, subscribing to a newsletter from the third party system 130, and redeeming an offer from the third party system 130, in which clicking on the content item corresponds to an entry point event and redeeming the offer corresponds to an exit point event. In this example, a system administrator for the third party system 130 may modify the entry point event to correspond to accessing the website. Similarly, in this example, the system administrator may modify the exit point event to correspond to subscribing to the newsletter.

Once determined, a sequential order of types of events associated with a third party system 130 may be stored. For example, suppose that a content campaign associated with a third party system 130 is associated with an objective of maximizing installations of an application associated with the third party system 130. In this example, if a sequential order of types of events associated with the third party system 130 includes an exit point event corresponding to installing the application, the sequence determination module 240 may store information describing the sequential order of types of events in association with an object representing the content campaign (e.g., in the content store 210). The functionality of the sequence determination module 240 is further described below in conjunction with FIGS. 3, 6, and 7.

The machine-learning module 245 may train (e.g., as shown in step 340 of FIG. 3) a set of models to predict likelihoods that online system users will perform a sequence of actions associated with a third party system 130 corresponding to a sequential order of types of events. Each model trained by the machine-learning module 245 may correspond to each type of event in the sequential order of types of events and the models may be ordered according to the sequence. The machine-learning module 245 may train the set of models using data describing actions corresponding to the types of events previously performed by users of the online system 140 or other individuals (e.g., retrieved from the action log 220). For example, the machine-learning module 245 may train a set of machine-learning models to predict a likelihood that an online system user will perform individual events (e.g., actions) or a sequence of actions associated with a third party system 130 corresponding to a sequential order of types of events. In this example, each model is trained based on historical information describing an action corresponding to each event that was previously performed by the user or by other users having at least a threshold measure of similarity to the user.

In embodiments in which the machine-learning module 245 trains a set of machine-learning models to predict likelihoods that online system users will perform a sequence of actions corresponding to a sequential order of types of events, different weights may be assigned to different models. The machine-learning module 245 may assign the weights based on various factors, such as node counts associated with nodes of a directed graph corresponding to the types of events, a sequential order of the types of events, an amount of training data available to train each model, etc. The machine-learning module 245 also may assign different weights to different models to optimize for a desired type of event corresponding to a model. For example, to optimize for the occurrence of a particular type of event identified as an exit point for a sequential order of types of events, the machine-learning module 245 may assign a highest weight to a machine-learning model corresponding to that event in a set of machine learning models corresponding to the sequential order of the types of events, but may include weights for the models of the earlier events in the sequence. Conversely, when there is limited training data for later events in the sequence (e.g., the identified exit point event), earlier events that have more training data (or higher confidence in the model's prediction), may be assigned higher a higher weight than the later event. Because the sequence of events can be automatically identified based on the user interactions and generated event nodes, the sequence and models can be generated automatically as users interact with the third party website, and the models can be re-trained and re-weighed as additional data is received for the events.

In embodiments in which the machine-learning module 245 assigns different weights to different models to optimize for the occurrence of a type of event associated with a third party system 130, the type of event may be specified by a user or other entity associated with the third party system 130. Alternatively, the machine-learning module 245 may select the type of event to be optimized by default (e.g., based on an amount of training data available to train each model). For example, if at least a threshold amount of training data is only available to train a model corresponding to a first type of event in a sequential order of types of events, the machine-learning module 245 may assign a highest weight to this model to optimize for the occurrence of this type of event. Training a set of machine-learning models to predict a likelihood that a user of the online system 140 will perform a sequence of actions and assigning weights to the models is further described in U.S. patent application Ser. No. 15/722,126, filed on Oct. 2, 2017, which is hereby incorporated by reference in its entirety.

Once the machine-learning module 245 has trained a set of models, the online system 140 may use the set of models to predict (e.g., as shown in step 355 of FIG. 3) likelihoods that users of the online system 140 will perform a sequence of actions associated with a third party system 130 corresponding to a sequential order of types of events. For example, suppose that the machine-learning module 245 has trained a set of machine-learning models to predict likelihoods that users of the online system 140 will perform a sequence of actions associated with a third party system 130 corresponding to a sequential order of types of events. Suppose also that the content selection module 250, described below, has determined that a viewing user of the online system 140 is eligible to be presented with a set of content items included in a content campaign associated with an objective corresponding to an exit point event of the sequential order of types of events. In this example, the online system 140 may provide a set of attributes for the viewing user (e.g., user profile information associated with the viewing user stored in the user profile store 205, actions previously performed by the viewing user stored in the action log 220 or the edge store 225, etc.) as inputs to the trained set of machine-learning models. Continuing with this example, the online system 140 may then receive a set of outputs from the set of models describing a predicted likelihood that the viewing user will perform the sequence of actions associated with the third party system 130 in response to being presented with the content item(s). Finally, in this example, the content selection module 250 may determine whether to present the content item to the viewing user based on the predicted likelihood of the various events in the sequence, which may be weighed according to weights of the models or the likelihood that the user continues from event to another in the sequential order of events. This may be performed in a content selection process as further described below. The functionality of the machine-learning module 245 is further described below in conjunction with FIGS. 3 and 7.

The content selection module 250 selects one or more content items for communication to a client device 110 to be presented to a viewing user of the online system 140. Content items eligible for presentation to the viewing user are retrieved from the content store 210 or from another source by the content selection module 250, which selects one or more of the content items for presentation to the viewing user. A content item eligible for presentation to a viewing user is a content item associated with at least a threshold number of targeting criteria satisfied by characteristics of the viewing user or is a content item that is not associated with targeting criteria. In various embodiments, the content selection module 250 includes content items eligible for presentation to a viewing user in one or more content selection processes, which identify a set of content items for presentation to the viewing user. For example, the content selection module 250 determines measures of relevance of various content items to a viewing user based on characteristics associated with the viewing user by the online system 140 and based on the viewing user's affinity for different content items. Based on the measures of relevance, the content selection module 250 selects content items for presentation to the viewing user. As an additional example, the content selection module 250 selects content items having the highest measures of relevance or having at least a threshold measure of relevance for presentation to a viewing user. Alternatively, the content selection module 250 ranks content items based on their associated measures of relevance and selects content items having the highest positions in the ranking or having at least a threshold position in the ranking for presentation to a viewing user.

In some embodiments, the content selection module 250 selects one or more content items for presentation to a viewing user of the online system 140 based on a predicted likelihood that the viewing user will perform a sequence of actions associated with an objective of the content item(s). For example, if an objective associated with a content item corresponds to maximizing a number of installations of an application and the content selection module 250 has identified the content item as being eligible for presentation to a viewing user of the online system 140, the content selection module 250 may rank the content item among additional content items that are eligible for presentation to the viewing user. In this example, the content selection module 250 may rank the content item based on a predicted likelihood that the viewing user will perform a sequence of actions corresponding to a sequential order of types of events, in which an exit point event included in the sequence corresponds to installing the application. Continuing with this example, the content selection module 250 may select one or more of the highest ranked content items for presentation to the viewing user. Alternatively, in the above example, the content selection module 250 may rank the content item based on a predicted likelihood that other users of the online system 140 having at least a threshold measure of similarity to the viewing user (e.g., users of the same age, who live in the same geographic region, and who share the same interests) will perform the sequence of actions.

Content items selected for presentation to a viewing user may be associated with bid amounts. The content selection module 250 may use the bid amounts associated with content items when selecting content for presentation to the viewing user. In various embodiments, the content selection module 250 determines an expected value associated with various content items based on their bid amounts and selects content items associated with a maximum expected value or associated with at least a threshold expected value for presentation to a viewing user. An expected value associated with a content item represents an expected amount of compensation to the online system 140 for presenting a content item. For example, the expected value associated with a content item is a product of the content item's bid amount and a likelihood of a viewing user interacting with content from the content item. The content selection module 250 may rank content items based on their associated bid amounts and select content items having at least a threshold position in the ranking for presentation to a viewing user. In some embodiments, the content selection module 250 ranks both content items not associated with bid amounts and content items associated with bid amounts in a unified ranking based on bid amounts and measures of relevance associated with content items. Based on the unified ranking, the content selection module 250 selects content for presentation to the viewing user. Selecting content items through a unified ranking is further described in U.S. patent application Ser. No. 13/545,266, filed on Jul. 10, 2012 (U.S. Publication No. US2014/0019261 A1, published on Jan. 16, 2014), which is hereby incorporated by reference in its entirety.

For example, the content selection module 250 receives a request to present a feed of content to a viewing user of the online system 140. The feed may include one or more advertisements as well as other content items, such as stories describing actions associated with other online system users connected to the viewing user. The content selection module 250 accesses one or more of the user profile store 205, the content store 210, the action log 220, and the edge store 225 to retrieve information about the viewing user. For example, stories or other data associated with users connected to the viewing user are retrieved. The retrieved stories or other content items are analyzed by the content selection module 250 to identify candidate content that is likely to be relevant to the viewing user. For example, stories associated with users not connected to the viewing user or stories associated with users for which the viewing user has less than a threshold affinity are discarded as candidate content. Based on various criteria, the content selection module 250 selects one or more of the content items identified as candidate content for presentation to the viewing user. The selected content items may be included in a feed of content that is presented to the viewing user. For example, the feed of content includes at least a threshold number of content items describing actions associated with users connected to the viewing user via the online system 140.

In various embodiments, the content selection module 250 presents content to a viewing user through a newsfeed including a plurality of content items selected for presentation to the viewing user. One or more advertisements also may be included in the feed. The content selection module 250 may also determine the order in which selected content items are presented via the feed. For example, the content selection module 250 orders content items in a feed based on likelihoods of a viewing user interacting with various content items. The functionality of the content selection module 250 is further described below in conjunction with FIG. 3.

The web server 255 links the online system 140 via the network 120 to the one or more client devices 110, as well as to the one or more third party systems 130. The web server 255 serves web pages, as well as other content, such as JAVA®, FLASH®, XML and so forth. The web server 255 may receive and route messages between the online system 140 and the client device 110, for example, instant messages, queued messages (e.g., email), text messages, short message service (SMS) messages, or messages sent using any other suitable messaging technique. A user may send a request to the web server 255 to upload information (e.g., images or videos) that are stored in the content store 210. Additionally, the web server 255 may provide application programming interface (API) functionality to send data directly to native client device operating systems, such as IOS®, ANDROID™, or BlackberryOS.

Figure 3:
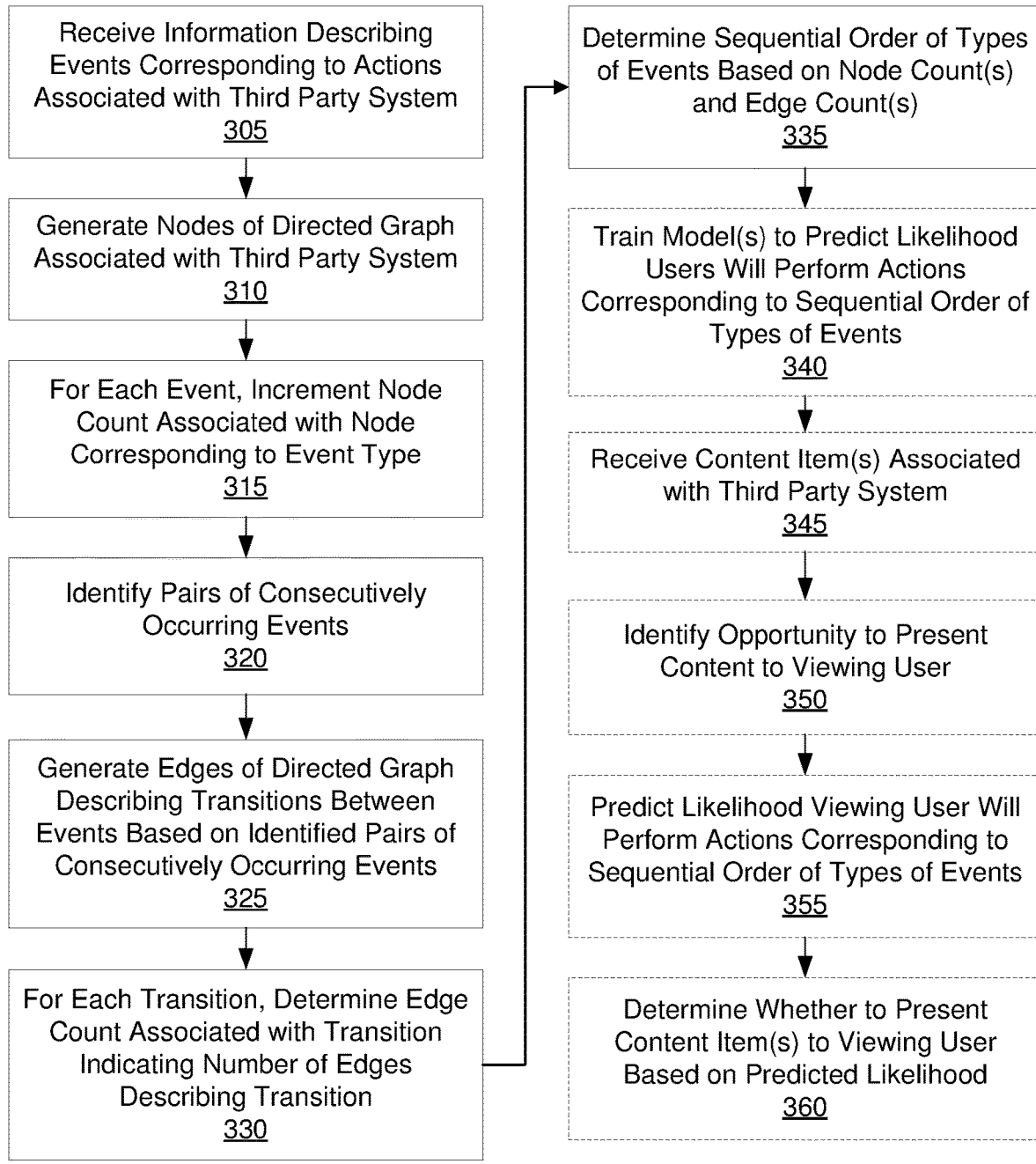
FIG. 3 is a flow chart of a method for determining a sequential order of types of events based on user actions associated with a third party system, in accordance with an embodiment.

Determining a Sequential Order of Types of Events Based on User Actions Associated with a Third Party System FIG. 3 is a flow chart of a method for determining a sequential order of types of events based on user actions associated with a third party system. In other embodiments, the method may include different and/or additional steps than those shown in FIG. 3. Additionally, steps of the method may be performed in a different order than the order described in conjunction with FIG. 3.

The online system 140 receives 305 (e.g., using the action logger 215) information describing events corresponding to actions associated with a third party system 130 performed by one or more users of the online system 140 and/or by one or more other individuals. The information may be received 305 via a tracking mechanism, such as a tracking pixel embedded into a content item or a page associated with the third party system 130, an API or SDK, a cookie, or any other suitable mechanism. The information may describe or identify the third party system 130, each type of event/action, the users/individuals who performed the actions, and the times at which the events/actions occurred/were performed.

Figure 4:
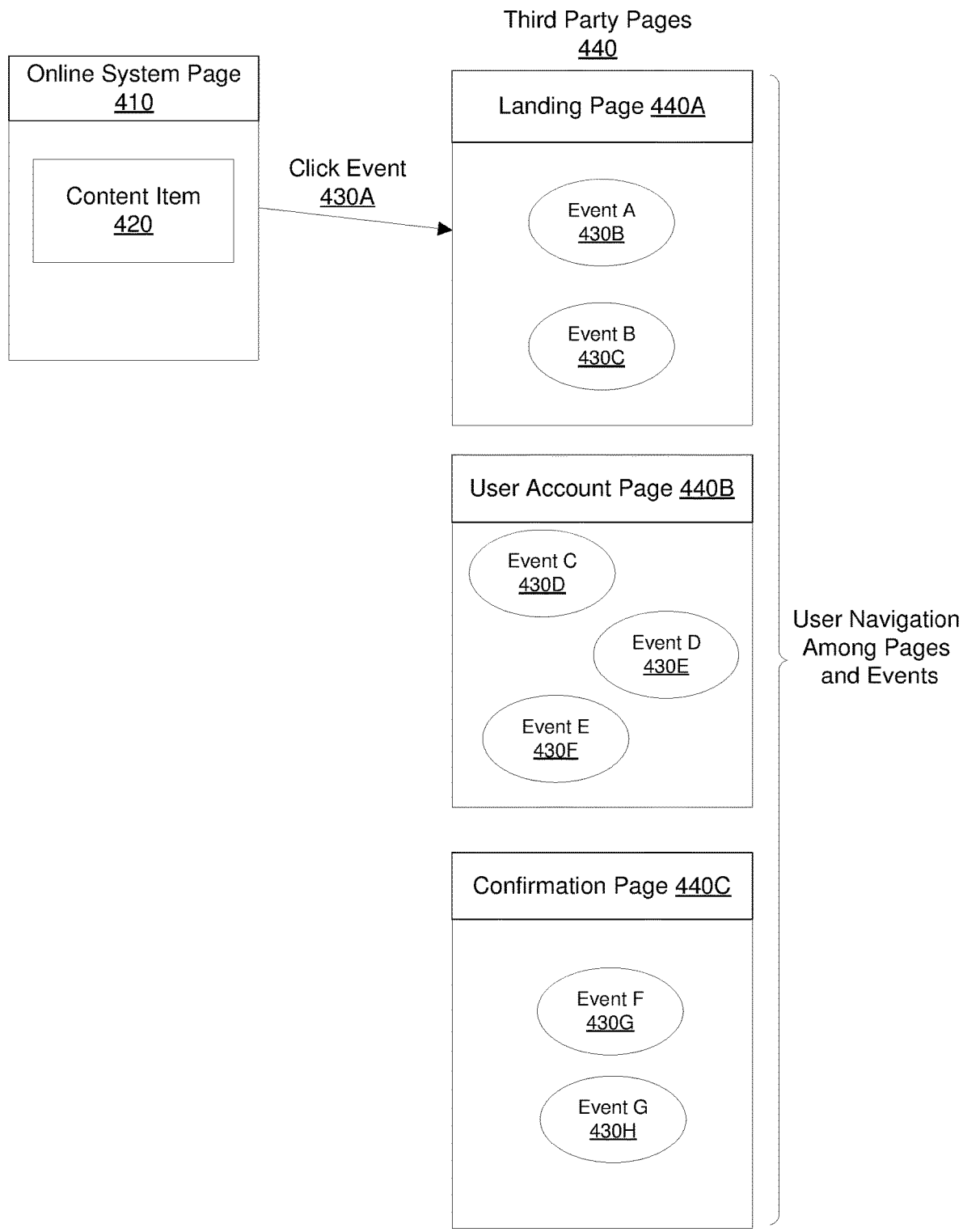
FIG. 4 is a conceptual diagram of user actions associated with a third party system, in accordance with an embodiment.

Examples of the actions/events associated with the third party system 130 are illustrated in FIG. 4. In this example, the online system 140 may present a content item 420 associated with a third party system 130 to a user of the online system 140 via a page 410 maintained in the online system 140. The online system 140 may then receive 305 information describing a click event 430A associated with the content item 420. In response to clicking on the content item 420, the user may be directed to a landing page 440A associated with the third party system 130, at which the user may perform actions corresponding to Event A 430B and Event B 430C, such as requesting to access a user account maintained in the third party system 130 and searching for products sold by the third party system 130. The user also may navigate to a user account page 440B at which the user may perform additional actions corresponding to Events C-E 430D-F, such as subscribing to a newsletter from the third party system 130, changing a password or email address associated with the user account, and modifying a mailing address associated with the user account. The user also may navigate to a confirmation page 440C at which the user may perform additional actions corresponding to Events F-G 430G-H, such as viewing an order history or cancelling a recent order.

Figure 5:
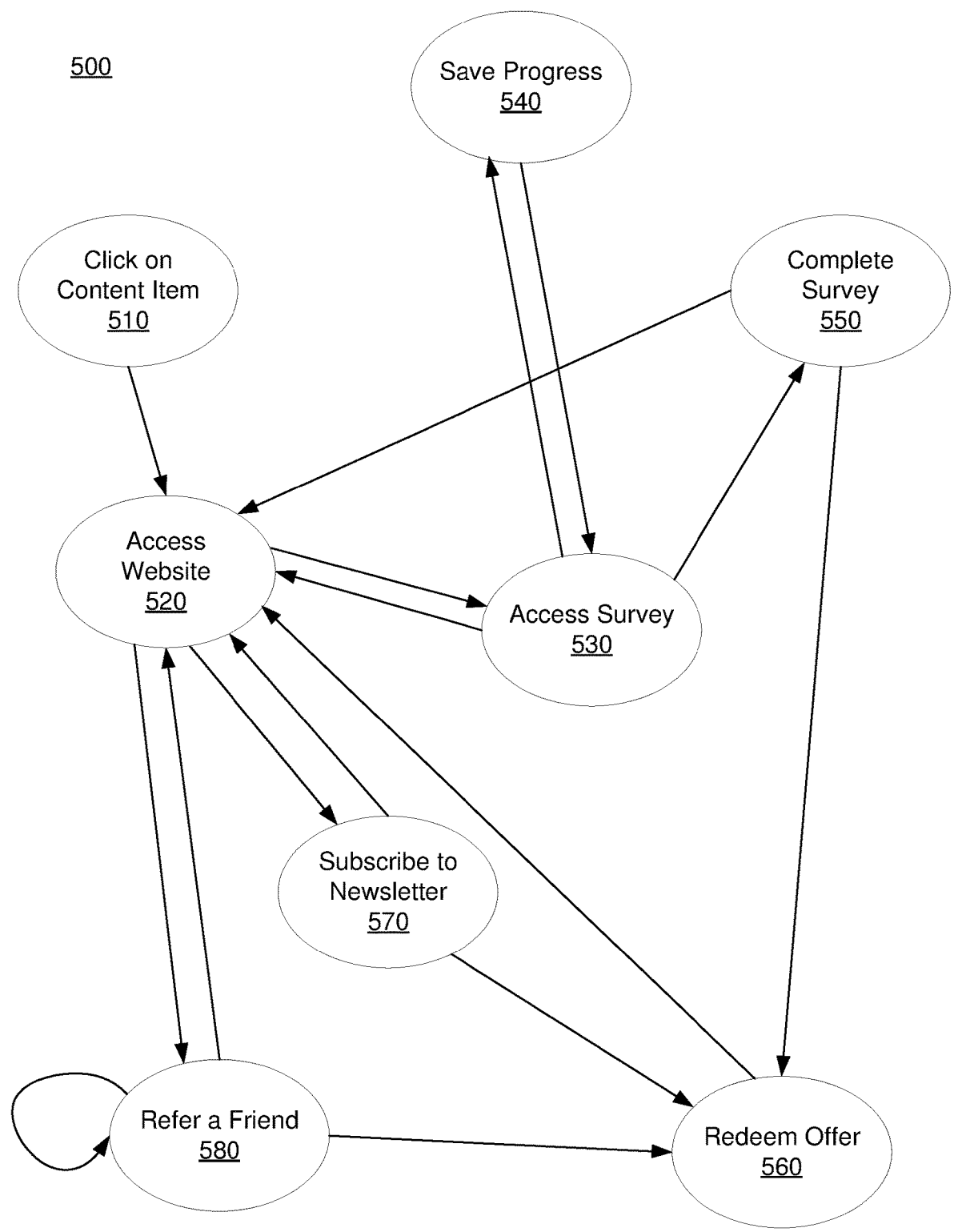
FIG. 5 is an example of a directed graph of types of events generated based on user actions associated with a third party system, in accordance with an embodiment.

Referring back to FIG. 3, the online system 140 then generates 310 (e.g., using the graph generator 230) one or more nodes of a directed graph associated with the third party system 130, in which each node corresponds to a type of event associated with the third party system 130. For example, as shown in FIG. 5, the online system 140 generates 310 multiple nodes of a directed graph 500 associated with a third party system 130. The nodes depicted in FIG. 5 correspond to types of events including clicking on a content item 510, accessing a website 520, accessing a survey 530, saving progress within the survey 540, completing the survey 550, redeeming an offer 560, subscribing to a newsletter 570, and referring a friend 580.

Referring again to FIG. 3, for each event, the online system 140 increments 315 (e.g., using the counting module 235) a node count associated with a node of the directed graph, in which the node corresponds to a type of event associated with the event. In various embodiments, the online system 140 may increment (in step 315) node counts associated with nodes of the directed graph based on a specified timeframe (e.g., one day, seven days, 14 days, etc.) in which the events may occur. In such embodiments, the timeframe may be specified by an online system user or other entity associated with the third party system 130.

The online system 140 then identifies (in step 320, e.g., using the graph generator 230) pairs of consecutively occurring events associated with the third party system 130. The online system 140 may do so by first identifying actions associated with the third party system 130 performed by the same users/individuals. The online system 140 may then identify 320 each pair of consecutively occurring events based on the times at which these events occurred.

The online system 140 then generates (in step 325, e.g., using the graph generator 230) edges of the directed graph based on the pairs of consecutively occurring events that are identified 320. Each edge of the directed graph generated 325 by the online system 140 describes a transition from a first event of a pair of consecutively occurring events to a second event of the pair of consecutively occurring events. For example, referring again to FIG. 5, suppose that the event of clicking on the content item 510 and the event of accessing the website 520 are identified 320 as a pair of consecutively occurring events, in which the event of clicking on the content item 510 occurs before the event of accessing the website 520. In this example, the online system 140 generates 325 an edge (shown as an arrow) describing a transition from the event of clicking on the content item 510 to the event of accessing the website 520. As an additional example, suppose that the event of referring a friend 580 occurs twice and that the events are identified 320 as a pair of consecutively occurring events. As shown in the example of FIG. 5, the online system 140 generates 325 an edge (shown as a circular arrow) describing a transition from the event of referring a friend 580 back to the event of referring a friend 580.

Referring again to FIG. 3, for each transition described by one or more edges of the directed graph associated with the third party system 130, the online system 140 determines 330 (e.g., using the counting module 235) an edge count associated with the transition indicating a number of edges describing the transition. In embodiments in which the online system 140 increments (in step 315) node counts associated with the nodes based on a specified timeframe, the edge count also may be determined 330 based on the same timeframe.

The online system 140 then determines 335 (e.g., using the sequence determination module 240) a sequential order of types of events associated with the third party system 130 based on one or more node counts associated with one or more nodes and one or more edge counts associated with one or more transitions described by the directed graph. To determine 335 the sequence of types of events, the online system 140 may identify a first node and a last node of the directed graph, in which the first node corresponds to an entry point event and the last node corresponds to an exit point event. The first node and the last node may be identified based on node counts associated with the nodes and one or more edge counts associated with transitions to or from the nodes, such that few, if any events occur before the entry point event and few, if any events occur after the exit point event. Furthermore, types of events that may occur between the entry point event and the exit point event may be identified based on a directionality and/or a bidirectionality of transitions to, from, and between the types of events.

Figure 6:
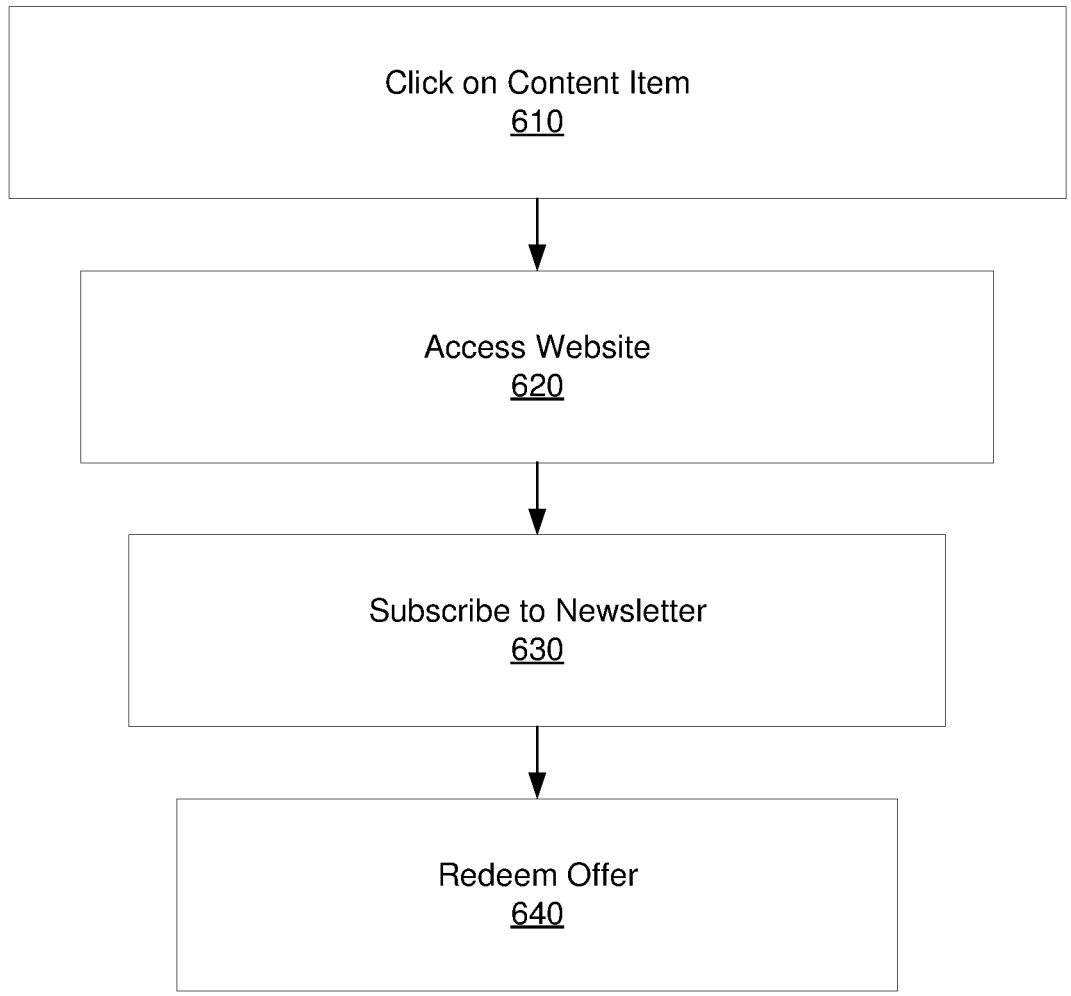
FIG. 6 is an example of a funnel having stages corresponding to a sequential order of types of events associated with a third party system, in accordance with an embodiment.

The sequential order of types of events may be visually represented as a funnel, in which the types of events correspond to stages of the funnel that are organized based on the sequential order and users or other individuals may progress along stages within the funnel by performing actions corresponding to the stages. As shown in the example of FIG. 6, users of the online system 140 or other individuals may progress from a first stage 610 of a funnel 600 corresponding to clicking on a content item associated with a third party system 130 to a second stage 620 of the funnel 600 corresponding to accessing a website associated with the third party system 130, to a third stage 630 of the funnel 600 corresponding to subscribing to a newsletter from the third party system 130, and to a fourth and last stage 640 of the funnel 600 corresponding to redeeming an offer from the third party system 130. The size of each stage indicates that more users/individuals are likely to perform actions corresponding to the early stages of the funnel 600 than in the later stages of the funnel 600.

Figure 7:
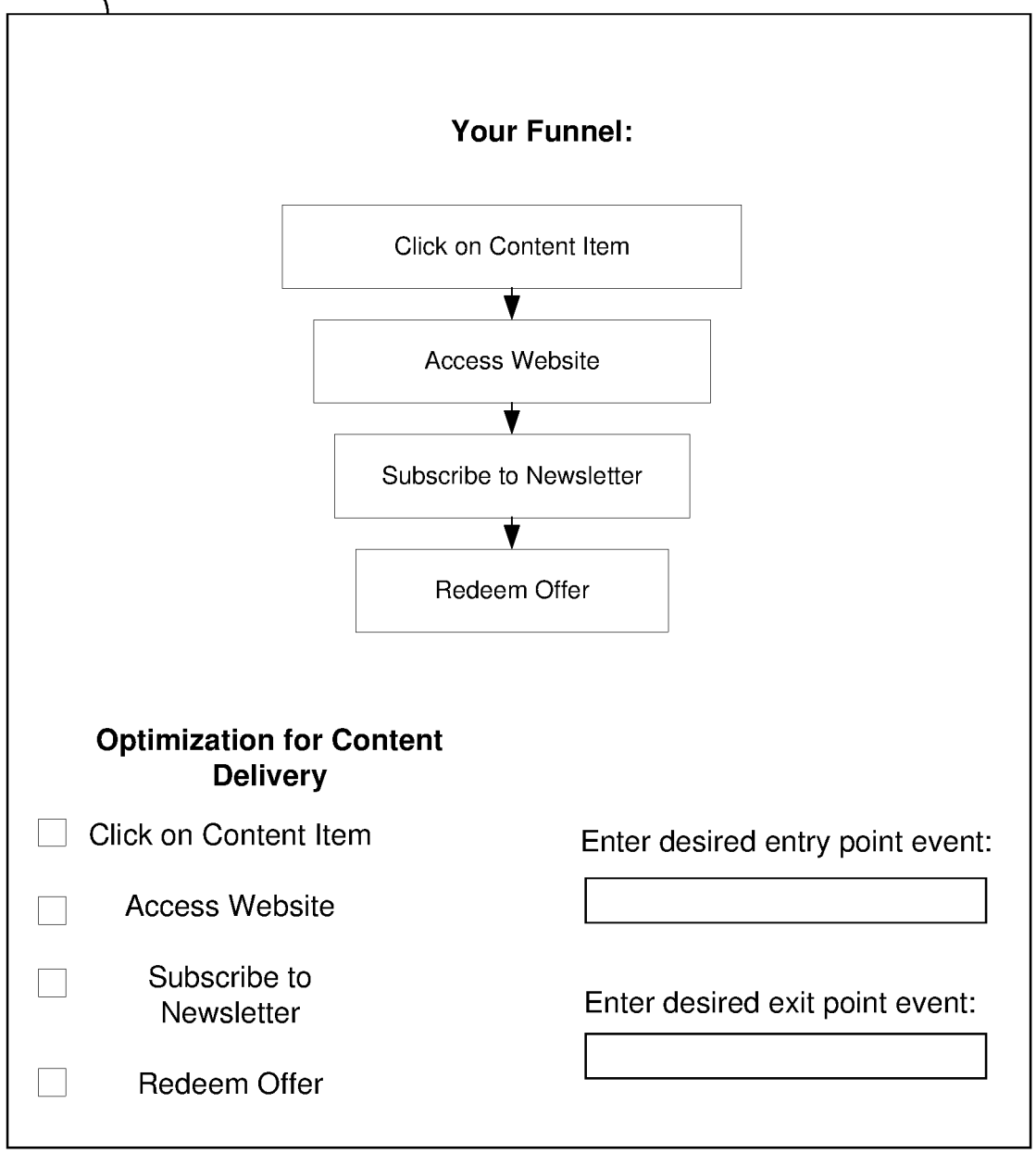
FIG. 7 is an example of a user interface capable of receiving inputs associated with sequential stages of a funnel associated with a third party system, in accordance with an embodiment.

In some embodiments, the sequential order of types of events associated with the third party system 130 may be modified. For example, as shown in FIG. 7, suppose that a sequential order of types of events associated with the third party system 130 is visually represented as a funnel in a user interface 700 presented by the online system 140. In this example, the stages correspond to clicking on a content item associated with the third party system 130, accessing a website associated with the third party system 130, subscribing to a newsletter from the third party system 130, and redeeming an offer from the third party system 130, in which clicking on the content item corresponds to an entry point event and redeeming the offer corresponds to an exit point event. Continuing with this example, a system administrator for the third party system 130 may specify a different entry point event and/or a different exit point event in a field of the user interface 700.

Referring now to FIG. 3, in some embodiments, the online system 140 may train 340 (e.g., using the machine-learning module 245) a set of models to predict likelihoods that online system users will perform a sequence of actions corresponding to the sequential order of types of events. Each model may correspond to each type of event in the sequential order of types of events and the models may be ordered according to the sequence. The online system 140 may train 340 the set of models based on a set of training data included among the data received 305 by the online system 140 describing the events associated with the third party system 130.

When training 340 the set of models, different weights may be assigned to different models based on various factors (e.g., based on node counts associated with nodes corresponding to the types of events, the sequential order of types of events, the amount of training data available to train 340 each model, etc.). Furthermore, the online system 140 also may assign different weights to different models to optimize for the occurrence of a type of event corresponding to a model within the set of models (e.g., by assigning a highest weight to a model corresponding to the event). In embodiments in which different weights are assigned to different models to optimize for the occurrence of a type of event, the type of event may be selected by default (e.g., based on an amount of training data available to train 340 each model). The type of event to be optimized also may be specified by a user or other entity associated with the third party system 130. For example, as shown in FIG. 7, the user interface 700 may include interactive elements (e.g., checkboxes) that allow a system administrator associated with the third party system 130 to select a type of event to be optimized.

Referring once more to FIG. 3, the online system 140 may receive 345 one or more content items associated with the third party system 130 (e.g., from an online system user or any other entity associated with the third party system 130), in which the content item(s) are associated with an objective corresponding to an event within the sequential order of types of events. For example, suppose that an exit point event included in the sequential order of types of events corresponds to achieving a conversion associated with the third party system 130. In this example, the online system 140 may receive 345 a set of content items included in a content campaign associated with the third party system 130, in which the content campaign is associated with an objective of achieving a maximum number of the conversions.

Upon identifying 350 an opportunity to present content to a viewing user of the online system 140, the online system 140 may predict 355 (e.g., using the set of machine-learning models) a likelihood that the viewing user will perform a sequence of actions corresponding to the sequential order of types of events associated with the third party system 130. The online system 140 may then determine 360 (e.g., using the content selection module 250) whether to present the content item(s) to the viewing user based on the predicted likelihood (e.g., in a content selection process that ranks the content item(s) among other content items eligible for presentation to the viewing user based on the predicted likelihood and selects one or more content items to present to the user based on the ranking). For example, the online system 140 may determine 360 whether to retarget a content item to a viewing user who accessed a web page associated with the third party system 130 by clicking on a content item associated with the third party system 130, but did not perform additional actions that would have satisfied an objective associated with the content item.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving, at an online system, information describing a plurality of events corresponding to actions associated with a third party system performed by one or more individuals, the information describing types of events associated with the plurality of events and times at which the plurality of events occurred;
generating nodes of a directed graph associated with the third party system, each node corresponding to a type of event;
for each of the plurality of events, incrementing a node count associated with a node corresponding to a type of event associated with the event;
identifying one or more pairs of consecutively occurring events from the plurality of events based at least in part on the times at which the plurality of events occurred;
generating one or more edges of the directed graph based at least in part on the one or more identified pairs of consecutively occurring events, each of the one or more edges describing a transition from a first event of a pair of consecutively occurring events to a second event of the pair of consecutively occurring events;
for each transition described by the one or more edges, determining an edge count associated with the transition indicating a number of edges describing the transition;
determining a sequential order of a set of types of events based at least in part on one or more node counts and one or more edge counts;
identifying an opportunity to present a content item to a viewing user of the online system, wherein an objective associated with the content item corresponds to a type of event included in the set of types of events;
applying a set of machine-learning models to attributes of the viewing user, wherein the set of machine-learning models are trained to predict a likelihood that the viewing user will perform a sequence of events corresponding to the determined sequential order of the set of types of events, each of the set of machine-learning models respectively corresponding to a type of event in the set of types of events, wherein the set of machine-learning models is ordered according to the sequence of events;

determining whether to present the content item to the viewing user based on the predicted likelihood; and presenting the content item to the viewing user.

2. The method of claim 1, wherein the one or more edges indicate one or more selected from the group consisting of: a directionality of the set of types of events, a co-occurrence of the set of types of events, and a bidirectionality of the set of types of events.

3. The method of claim 1, wherein determining the sequential order of the set of types of events based at least in part on the one or more node counts and the one or more edge counts comprises:

identifying a first node corresponding to an entry point event of the set of types of events, wherein the first node is associated with a node count that is at least a threshold value and a sum of one or more edge counts describing a set of transitions to the entry point event is less than an additional threshold value.

4. The method of claim 1, wherein determining the sequential order of the set of types of events based at least in part on the one or more node counts and the one or more edge counts comprises:

identifying a last node corresponding to an exit point event of the set of types of events, wherein the last node is associated with a node count that is less than a threshold value and a sum of one or more edge counts describing a set of transitions from the exit point event is less than an additional threshold value.

5. The method of claim 4, wherein the objective associated with the content item corresponds to the exit point event.

6. The method of claim 1, further comprising:

assigning a weight to each of the set of machine-learning models to optimize an occurrence of the type of event corresponding to the objective associated with the content item, the weight assigned based at least in part on one or more node counts associated with one or more nodes corresponding to the set of types of events and the sequential order of the set of types of events.

7. The method of claim 6, wherein the occurrence of the event is optimized by assigning a highest weight to a machine-learning model of the set of machine-learning models corresponding to the type of event corresponding to the objective associated with the content item.

8. The method of claim 6, wherein the weight assigned to each of the set of machine-learning models is further based at least in part on a size of a set of training data used to train each of the set of the machine-learning models.

9. The method of claim 1, wherein the information describing the plurality of events corresponding to the actions associated with the third party system performed by the individual are received from a plurality of client devices associated with the individual via one or more tracking pixels.

10. A computer program product comprising a computer readable storage medium having instructions encoded thereon that, when executed by a processor, cause the processor to:

receive, at an online system, information describing a plurality of events corresponding to actions associated with a third party system performed by one or more individuals, the information describing types of events associated with the plurality of events and times at which the plurality of events occurred;

generate nodes of a directed graph associated with the third party system, each node corresponding to a type of event;

for each of the plurality of events, increment a node count associated with a node corresponding to a type of event associated with the event;

identify one or more pairs of consecutively occurring events from the plurality of events based at least in part on the times at which the plurality of events occurred;

generate one or more edges of the directed graph based at least in part on the one or more identified pairs of consecutively occurring events, each of the one or more edges describing a transition from a first event of a pair of consecutively occurring events to a second event of the pair of consecutively occurring events;

for each transition described by the one or more edges, determine an edge count associated with the transition indicating a number of edges describing the transition;

determine a sequential order of a set of types of events based at least in part on one or more node counts and one or more edge counts;

identify an opportunity to present a content item to a viewing user of the online system, wherein an objective associated with the content item corresponds to a type of event included in the set of types of events;

apply a set of machine-learning models to attributes of the viewing user, wherein the set of machine-learning models are trained to predict a likelihood that the viewing user will perform a sequence of events corresponding to the determined sequential order of the set of types of events, each of the set of machine-learning models respectively corresponding to a type of event in the set of types of events, wherein the set of machine-learning models is ordered according to the sequence of events;

determine whether to present the content item to the viewing user based on the predicted likelihood; and present the content item to the viewing user.

11. The computer program product of claim 10, wherein the one or more edges indicate one or more selected from the group consisting of: a directionality of the set of types of events, a co-occurrence of the set of types of events, and a bidirectionality of the set of types of events.

12. The computer program product of claim 10, wherein determine the sequential order of the set of types of events based at least in part on the one or more node counts and the one or more edge counts comprises:

identify a first node corresponding to an entry point event of the set of the types of events, wherein the first node is associated with a node count that is at least a threshold value and a sum of one or more edge counts describing a set of transitions to the entry point event is less than an additional threshold value.

13. The computer program product of claim 10, wherein determine the sequential order of the set of types of events based at least in part on the one or more node counts and the one or more edge counts comprises:

identify a last node corresponding to an exit point event of the set of types of events, wherein the last node is associated with a node count that is less than a threshold value and a sum of one or more edge counts describing a set of transitions from the exit point event is less than an additional threshold value.

14. The computer program product of claim 13,
wherein the objective associated with the content item corresponds to the exit point event.

15. The computer program product of claim 10, wherein the computer readable storage medium further has instructions encoded thereon that, when executed by the processor, cause the processor to:
assign a weight to each of the set of machine-learning models to optimize an occurrence of the type of event corresponding to the objective associated with the content item, the weight assigned based at least in part on one or more node counts associated with one or more nodes corresponding to the set of types of events and the sequential order of the set of types of events.

16. The computer program product of claim 15, wherein the occurrence of the event is optimized by assigning a highest weight to a machine-learning model of the set of machine-learning models corresponding to the type of event corresponding to the objective associated with the content item.

17. The computer program product of claim 15, wherein the weight assigned to each of the set of machine-learning models is further based at least in part on a size of a set of training data used to train each of the set of the machine-learning models.

18. The computer program product of claim 10, wherein the information describing the plurality of events corresponding to the actions associated with the third party system performed by the individual are received from a plurality of client devices associated with the individual via one or more tracking pixels.

* * * * *